United States Patent
Okamura et al.

(10) Patent No.: US 10,379,974 B2
(45) Date of Patent: Aug. 13, 2019

(54) RECORDING MEDIUM STORING CONTROL PROGRAM, CONTROL DEVICE AND CONTROL METHOD

(71) Applicant: FUJITSU LIMITED, Kawasaki-shi, Kanagawa (JP)

(72) Inventors: Takashi Okamura, Yokohama (JP); Mitsuru Okajima, Yokohama (JP); Shu Matsuoka, Shibyua (JP); Takahiro Shimazaki, Kawasaki (JP); Hidehiko Mayumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 433 days.

(21) Appl. No.: 14/861,334

(22) Filed: Sep. 22, 2015

(65) Prior Publication Data

US 2016/0092321 A1    Mar. 31, 2016

(30) Foreign Application Priority Data

Sep. 30, 2014  (JP) ................... 2014-201032

(51) Int. Cl.
*H04W 4/02* (2018.01)
*G06F 11/20* (2006.01)
(Continued)

(52) U.S. Cl.
CPC ........... *G06F 11/203* (2013.01); *G08B 21/10* (2013.01); *H04L 12/1895* (2013.01);
(Continued)

(58) Field of Classification Search
CPC ......... H04W 4/22; H04W 4/90; H04W 76/50; H04W 4/02; H04L 67/18; H04L 12/1895
See application file for complete search history.

(56) References Cited

U.S. PATENT DOCUMENTS 9,226,274 B2 *  12/2015  Lee .................. H04W 72/0406
2009/0163170 A1 *  6/2009  Norp ..................... G08B 27/006
455/404.1
(Continued)

FOREIGN PATENT DOCUMENTS

JP    2014-86881       5/2014
WO    2014/091596 A1   6/2014

OTHER PUBLICATIONS

Japanese Office Action dated Nov. 4, 2015 in corresponding Japanese Patent Application No. 2014-201032.
(Continued)

*Primary Examiner* — Chirag R Patel
(74) *Attorney, Agent, or Firm* — Staas & Halsey LLP

(57) ABSTRACT

A non-transitory computer-readable recording medium stores therein a control program. The control program is executed by a control device that controls an access point conducting a communication by using a first identifier. The control device identifies an access point that becomes a target of disaster setting, in which a communication is conducted by using a second identifier different from the first identifier, on the basis of disaster information obtained from a providing source of information. The control device outputs, to a user interface, information for confirming whether or not the disaster setting is to be applied. Further, the control device sends an instruction to apply the disaster setting to the access point when a request to apply the disaster setting has been obtained.

8 Claims, 15 Drawing Sheets

(51) Int. Cl.
*H04W 76/50* (2018.01)
*H04W 4/90* (2018.01)
*H04L 12/18* (2006.01)
*H04L 29/08* (2006.01)
*H04L 12/24* (2006.01)
*G08B 21/10* (2006.01)

(52) U.S. Cl.
CPC .......... *H04L 41/0883* (2013.01); *H04L 67/18* (2013.01); *H04W 4/90* (2018.02); *H04W 76/50* (2018.02); *G06F 2201/805* (2013.01); *G06F 2201/86* (2013.01)

(56) References Cited

U.S. PATENT DOCUMENTS

2011/0111728 A1* 5/2011 Ferguson .......... H04M 1/72541
455/404.2
2015/0281934 A1 10/2015 Kawaguchi et al.

OTHER PUBLICATIONS

"Version 2.0 of Guideline for Emergency free Wi-Fi for the Large-Scale Disaster Relief" [online] Mar. 2, 2015, Wireless LAN Business Promotion Conference, the Internet <http://www.wlan-business.org/wp/wpcontent/uploads/2015/03/Wi-Fi_Free_Guideline_Ver.2.0_20150302_ja.pdf>.

"Version 1.0 of Guideline for Emergency free Wi-Fi for the Large-Scale Disaster Relief" [online] Apr. 21, 2014, Wireless LAN Business Promotion Conference, the Internet <http://www.wlan-business.org/info/pdf/Wi-Fi_Free_Guideline_v1.01_20140527.pdf>.

* cited by examiner

| REPORTING SOURCE OF DISASTER INFORMATION | | DISASTER TYPE | DISASTER LEVEL |
|---|---|---|---|
| DISASTER PREVENTION SERVER OF JAPAN METEOROLOGICAL AGENCY | | EARTHQUAKE | INTENSITY 5 UPPER |
| | | TSUNAMI | WARNINGS |
| | | WEATHER | WARNINGS |
| J-Alert | | EARTHQUAKE | INTENSITY 5 UPPER OR GREATER |
| | | ALL WARNINGS | |
| DISASTER INFORMATION MAIL | | EARTHQUAKE | INTENSITY 5 UPPER OR GREATER |

| DEVICE IP ADDRESS | OPENING CONDITION | | DETERMINATION CONDITION BASED ON INSTALLATION LOCATION | |
|---|---|---|---|---|
| | DISASTER TYPE | DISASTER LEVEL | DEVICE INSTALLATION LOCATION | ADJACENT AREA |
| 192.168.0.1 | EARTHQUAKE | INTENSITY OF 5 UPPER OR GREATER | EAST LONGITUDE 139 DEGREES, 45 MINUTES, 57.9 SECONDS; NORTH LATITUDE 35 DEGREES, 40 MINUTES, 53.0 SECONDS. | AREA THAT IS WITHIN 10 MINUTES IN LATITUDE OR LONGITUDE |
| 192.168.0.2 | TSUNAMI | WARNING | TAMA REGION | SURROUNDING AREA |

| E-MAIL ADDRESS |
|---|
| test1@test.com |
| test2@test.com |
|  |

F I G. 8

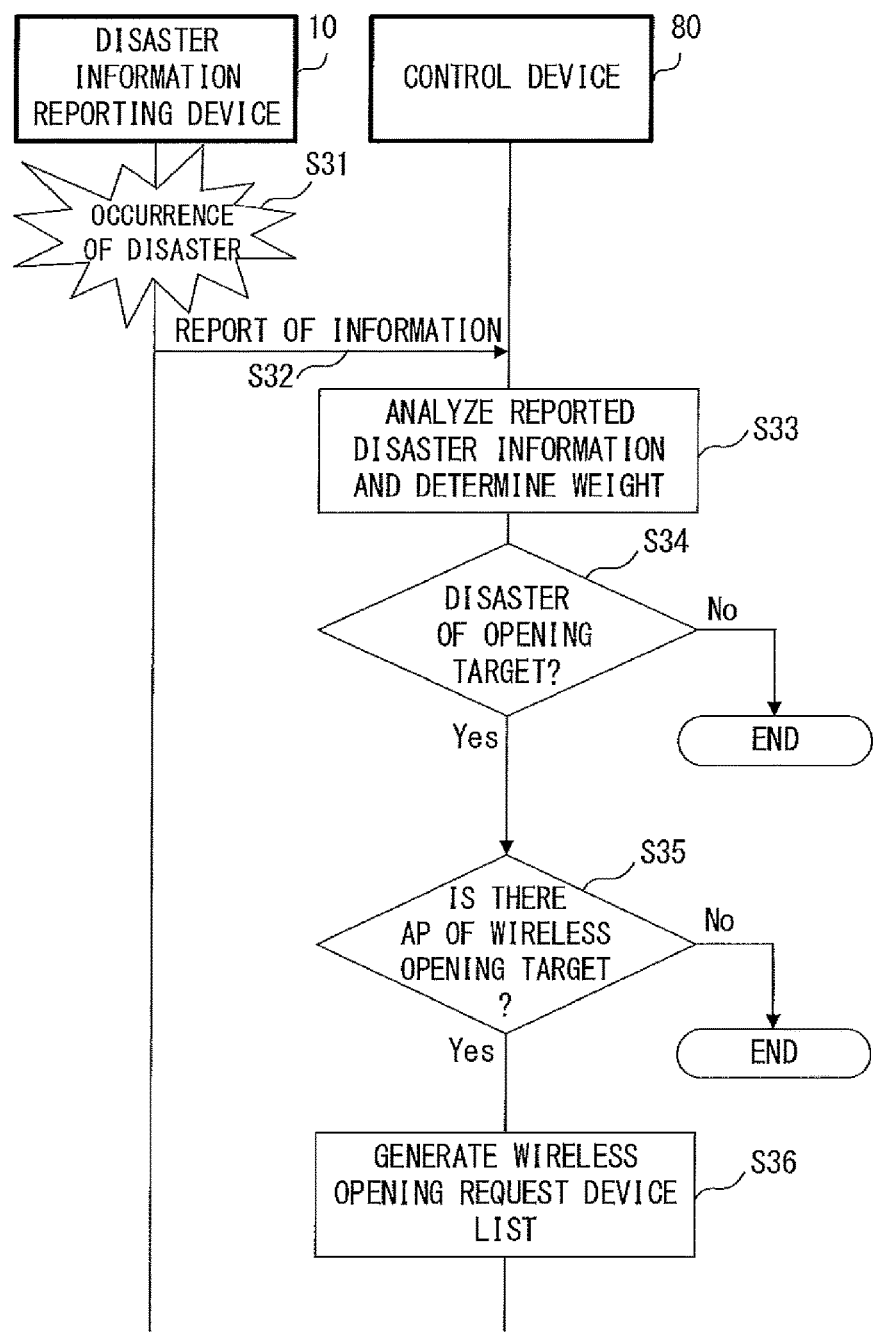
F I G. 1 1

| REPORTING SOURCE OF DISASTER INFORMATION | DISASTER TYPE | DISASTER LEVEL | WEIGHTING |
|---|---|---|---|
| DISASTER PREVENTION SERVER OF JAPAN METEOROLOGICAL AGENCY | EARTHQUAKE | INTENSITY OF 4 | 50 |
| | EARTHQUAKE | INTENSITY OF 5 UPPER | 100 |
| | TSUNAMI | WARNING | 100 |
| | TSUNAMI | ADVISORIES | 50 |
| | WEATHER | WARNING | 50 |
| | WEATHER | ADVISORIES | 30 |
| J-Alert | EARTHQUAKE | INTENSITY OF 5 UPPER OR GREATER | 100 |
| | ALL WARNINGS | | 100 |
| | ALL ADVISORIES | | 50 |
| DISASTER INFORMATION MAIL | EARTHQUAKE | INTENSITY OF 4 UPPER OR GREATER | 50 |

F I G. 1 2

| DEVICE IP ADDRESS | OPENING CONDITION | | DETERMINATION CONDITION BASED ON INSTALLATION LOCATION | | CURRENT WEIGHTING STATUS |
|---|---|---|---|---|---|
| | DISASTER TYPE | DISASTER LEVEL | DEVICE INSTALLATION LOCATION | ADJACENT AREA | |
| 192.168.0.1 | EARTHQUAKE | INTENSITY OF 5 UPPER OR GREATER | EAST LONGITUDE 139 DEGREES, 45 MINUTES, 57.9 SECONDS; NORTH LATITUDE 35 DEGREES, 40 MINUTES, 53.0 SECONDS. | AREA THAT IS WITHIN 10 MINUTES IN LATITUDE OR LONGITUDE | 100 |
| 192.168.0.2 | TSUNAMI | WARNING | TAMA REGION | SURROUNDING AREA | 50 |

FIG. 14

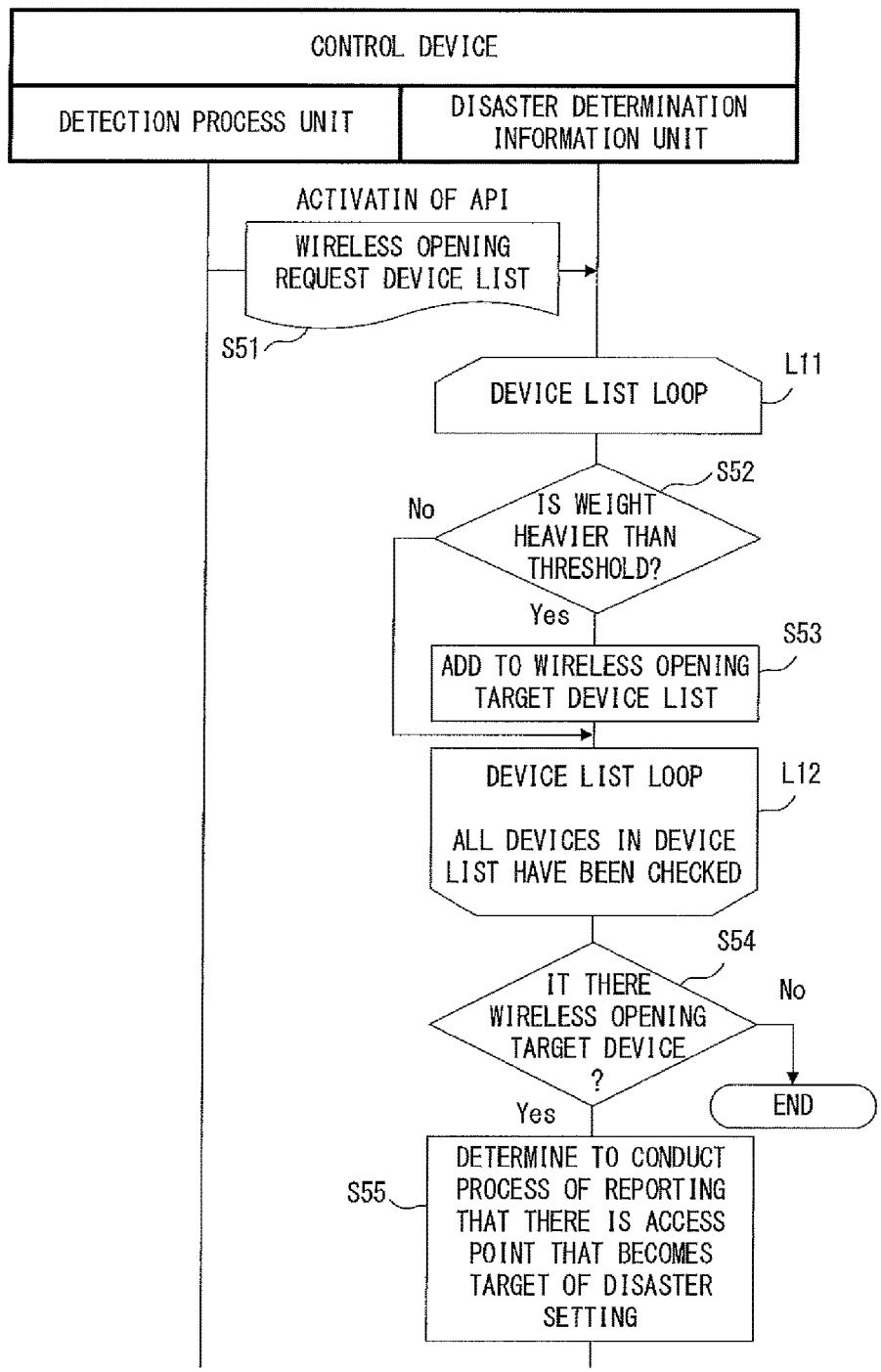
F I G. 1 5

RECORDING MEDIUM STORING CONTROL PROGRAM, CONTROL DEVICE AND CONTROL METHOD

CROSS-REFERENCE TO RELATED APPLICATION

This application is based upon and claims the benefit of priority of the prior Japanese Patent Application No. 2014-201032, filed on Sep. 30, 2014, the entire contents of which are incorporated herein by reference.

FIELD

The embodiments discussed herein are related to control of an access point.

BACKGROUND

When a disaster has occurred, it is important to secure communications in various situations such as victim relief, evacuation guidance, operations of evacuation centers, restoration support, etc. In recent years, the spread of mobile terminals such as smart phones or tablet computers provided with the wireless LAN (Local Area Network) function has led to expectation that wireless LAN will be utilized as communications in a case of a disaster. For example, guidelines have been drawn up for opening free accesses to wireless LANs provided by business entities that usually provide public wireless LAN services, in a case of a large-scale disaster. Opening of wireless LANs not only by business entities but also by local governments or by companies in a case of a disaster is also being discussed.

Also, in recent years, attention has been focused on virtual networks using software and on Software Defined Networking (SDN), which is a technique used for forming a virtual network. According to SDN, the topology and QoS (Quality of Service) of a network are set by way of software. According to this technique, a control device called a controller in a network monitors communication states of devices included in the network so as to conduct control in accordance with the states of the respective devices. Note that the only information used by a controller for conducting the setting of a network topology etc. is the communication states of monitoring target devices in the network.

The documents below are known as documents about related arts.
[Patent Document 1] Japanese Laid-open Patent Publication No. 2014-86881
[Non Patent Document 1] "Version 1.0 of Guideline for Emergency free Wi-Fi for the Large-Scale Disaster Relief" [online] Apr. 21, 2014, Wireless LAN Business Promotion Conference, the Internet <http://www.wlan-business.org/info/pdf/Wi-Fi_Free_Guideline_v1.01_20140527.pdf>

When a wireless LAN is opened in a case of a disaster, selection and a setting change are conducted for access points for accepting accesses that are made in response to the opening. Setting changes are conducted manually by the operator for each access point, leading to a situation where a large number of access points result in more complicated processes to be conducted by the operator and longer time for setting changes. Further, it is also difficult for the operator to select access points that are appropriate for the statuses of damages, the location of the disaster, etc.

SUMMARY

According to an aspect of the embodiments, a non-transitory computer-readable recording medium stores therein a control program. The control program is executed by a control device that controls an access point conducting a communication by using a first identifier. The control device identifies an access point that becomes a target of disaster setting, in which a communication is conducted by using a second identifier different from the first identifier, on the basis of disaster information obtained from a providing source of information. The control device outputs, to a user interface, information for confirming whether or not the disaster setting is to be applied. Further, the control device sends an instruction to apply the disaster setting to the access point when a request to apply the disaster setting has been obtained.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates an example of a disaster information table;
FIG. 7 illustrates an example of a control-target device table;
FIG. 8 illustrates an example of a reporting destination table;
FIG. 11 is a sequence diagram explaining an example of a method of identifying an access point;
FIG. 12 illustrates an example of a disaster information table used in the third embodiment;
FIG. 14 explains an example of a control-target device table used in the third embodiment;
and
FIG. 15 is a sequence diagram explaining an example of a determination process.

DESCRIPTION OF EMBODIMENTS

Figure 1:
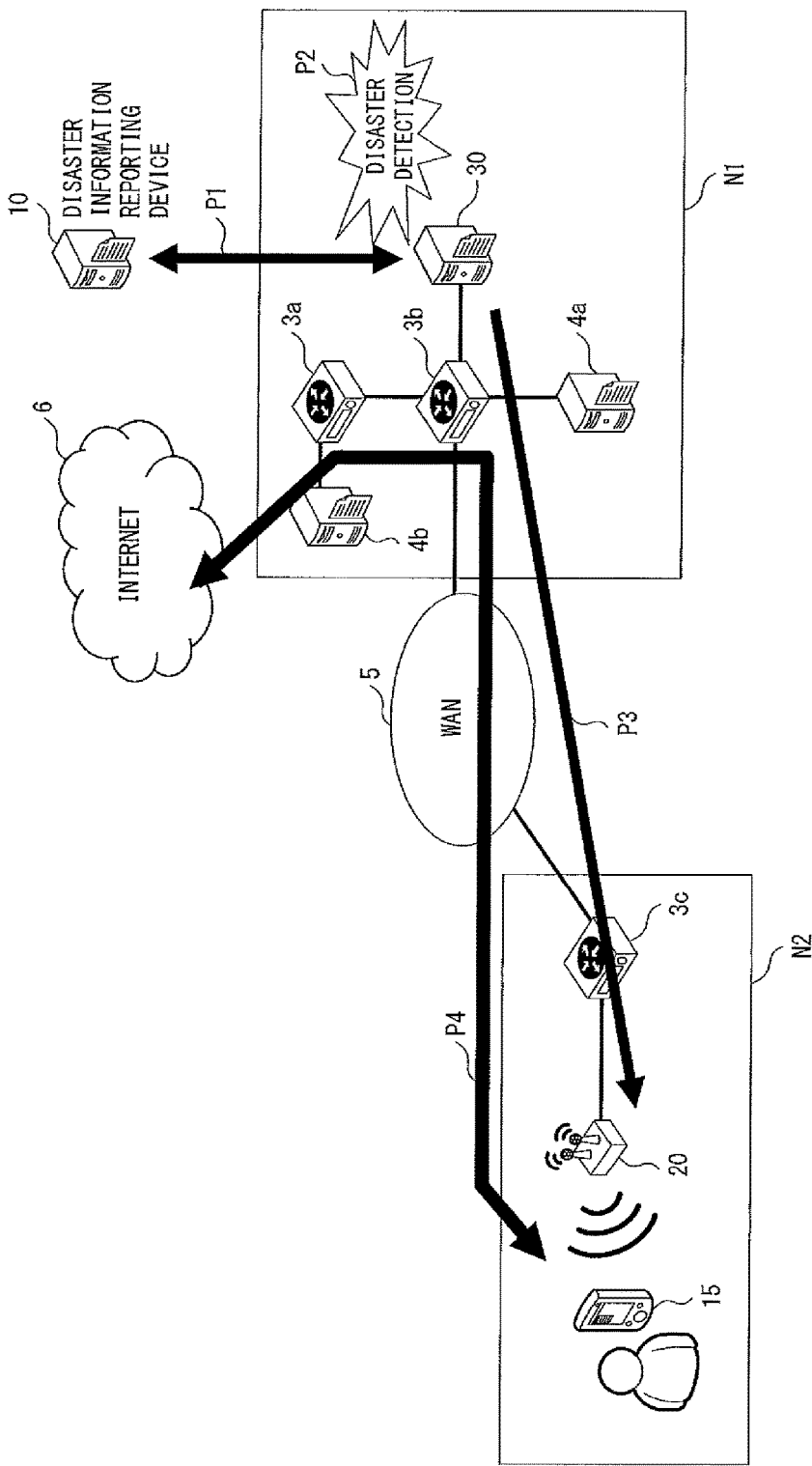
FIG. 1 illustrates an example of a control method according to an embodiment.

FIG. 1 illustrates an example of a control method according to an embodiment. In the example illustrated in FIG. 1, network N1 and network N2 are connected via a WAN (Wide Area Network) 5, and network N1 is connected to Internet 6. Network N1 includes a control device 30 and routers 3 (3a, 3b). Network N1 may optionally include communication devices 4 (4a, 4b), which are communication devices that are not the control device 30. It is assumed that when SDN is utilized for forming network N1 and network N2, the control device 30 can operate as an SDN controller.

Network N2 includes a router 3c and an access point 20. It is assumed that the access point 20 is conducting communications by using the first identifier in the initial state and setting has been conducted so that access permission is not given to terminals that are not using the first identifier for making requests for communications. Also, it is assumed that a terminal 15 does not hold the first identifier that is used in the access point 20. Accordingly, even when the terminal 15 has made a request for the establishment of communications, the access point 20 does not give communication permission.

As represented by procedure P1, the control device 30 communicates with a disaster information reporting device 10. When a disaster has occurred or when caution against a disaster is called for, the disaster information reporting device 10 reports information related to the disaster to the control device 30.

In procedure P2, the control device 30 uses a control program for conducting disaster setting of an access point so as to identify information related to the disaster and identify the access point 20 that is a target of the disaster setting. It is assumed in this example that communications are to be conducted with an unspecified user by using the second identifier, which is different from the first identifier, in the access point 20 to which the disaster setting has been applied. When the control device 30 has identified the access point 20 to which the disaster setting is to be applied, the control device 30 outputs, to the user interface, information for confirming whether or not the disaster setting is to be applied, and thereby reports the identified access point 20 to the operator. As a user interface, for example a display device such as a display monitor may be used.

Thereafter, in procedure P3, when the control device 30 has determined that information requesting that the disaster setting be applied has been obtained from the operator via an input device etc., the control device 30 sends an instruction for setting the access point 20 serving as a target of the disaster setting. In this process, the setting process of the access point 20 may be conducted by a control program that operates on the control device 30. Also, when the operations as the SDN controller are realized by a program that is different from the control program, the request for setting of the access point 20 is output to the API (Application Programming Interface) of an application software that is executed by the control program. In such a case, the request for setting is input to the SDN controller and the program operating as the SDN controller conducts the setting process of the access point 20.

It is assumed that setting was conducted in the access point 20 in accordance with the instruction received in procedure P3 so that communications by using the second identifier are made possible. Also, it is assumed that the second identifier is information held by the terminal 15 in advance or information that the terminal 15 can obtain in response to the occurrence a disaster.

In procedure P4, the terminal 15 requests that the access point 20 establish communications by using the second identifier. At that moment, the setting for communications using the second identifier has already been conducted in the access point 20. Then, the terminal 15 can conduct communications via the access point 20. This makes it possible for the user of the terminal 15 to conduct communications with a device in network N1, a device in the Internet 6, etc. via the access point 20. FIG. 1 illustrates a case where the terminal 15 communicates with a device in the Internet 6.

As described above, by using the control program according to the embodiment, the operator can receive from the control device 30 a proposal for the access points 20 whose opening is recommended on the basis of the disaster information. Further, when a change request to open the proposed access points 20 has been input, the control device 30 conducts a process of opening at least one proposed access point 20. This simplifies the selection and setting change of an access point whose setting is to be changed.

<Device Configuration>

Figure 2:
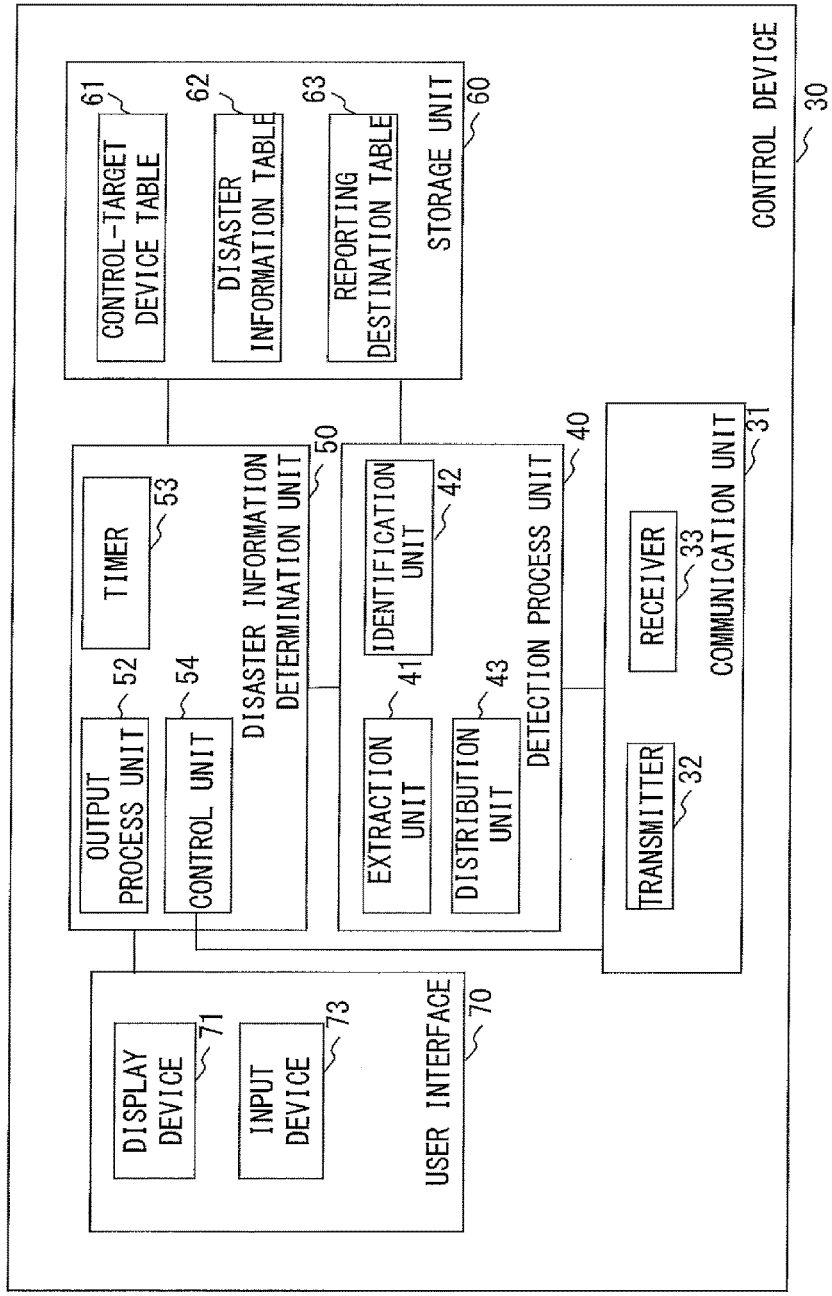
FIG. 2 illustrates an example of a configuration of a control device.

FIG. 2 illustrates an example of a configuration of the control device 30. The control device 30 includes a communication unit 31, a detection process unit 40, a disaster information determination unit 50, a storage unit 60 and a user interface 70. The communication unit 31 includes a transmitter 32 and a receiver 33. The detection process unit 40 includes an extraction unit 41, an identification unit 42 and a distribution unit 43. The disaster information determination unit 50 includes an output process unit 52 and a control unit 54, and optionally includes a timer 53. The storage unit 60 stores a control-target device table 61, a disaster information table 62 and a reporting destination table 63, and stores information used for the processes conducted by the detection process unit 40 and the disaster information determination unit 50 on an as-needed basis. In the example illustrated in FIG. 2, the control device 30 includes a display device 71 and an input device 73 as the user interface 70, however, the control device 30 may include an arbitrary number of input devices of arbitrary types and an arbitrary number of output devices of arbitrary types.

The receiver 33 receives a packet from a different device and outputs the received packet to the distribution unit 43. The transmitter 32 transmits a packet to a different device. The distribution unit 43 selects a packet containing disaster information from among packets input from the receiver 33, and outputs it to the extraction unit 41. It is assumed that the distribution unit 43 has stored a method of selecting a packet that contains disaster information in advance. The extraction unit 41 obtains disaster information from the input packet, and extracts information such as the disaster type of the disaster that has occurred, the scale of the disaster and the location of the disaster. The identification unit 42 identifies the access point 20 that is a target of the opening by using the disaster type, the scale of the disaster and the location of the disaster. The output process unit 52 outputs the information of the access point 20 identified by the identification unit 42 to the display device 71. Also, the output process unit 52 also conducts a process of reporting the information of the identified access point 20 to the reporting destination recorded in the reporting destination table 63.

Obtaining the request to open the access point 20 via the input device 73 and distribution unit 43, the control unit 54 conducts a process of opening the identified access point 20. Also it is also possible to conduct setting so that when the counter value of the timer 53 after the process was conducted by the output process unit 52 has exceeded a prescribed threshold, the control unit 54 conducts the process of opening the access point 20.

The control-target device table 61 includes information of the access point 20 controlled by the control device 30. The disaster information table 62 has recorded information such as the type and the scale, etc. of the disaster that caused the opening of the access point 20. Examples of the control-target device table 61, the disaster information table 62 and the reporting destination table 63 will be described later in detail.

Figure 3:
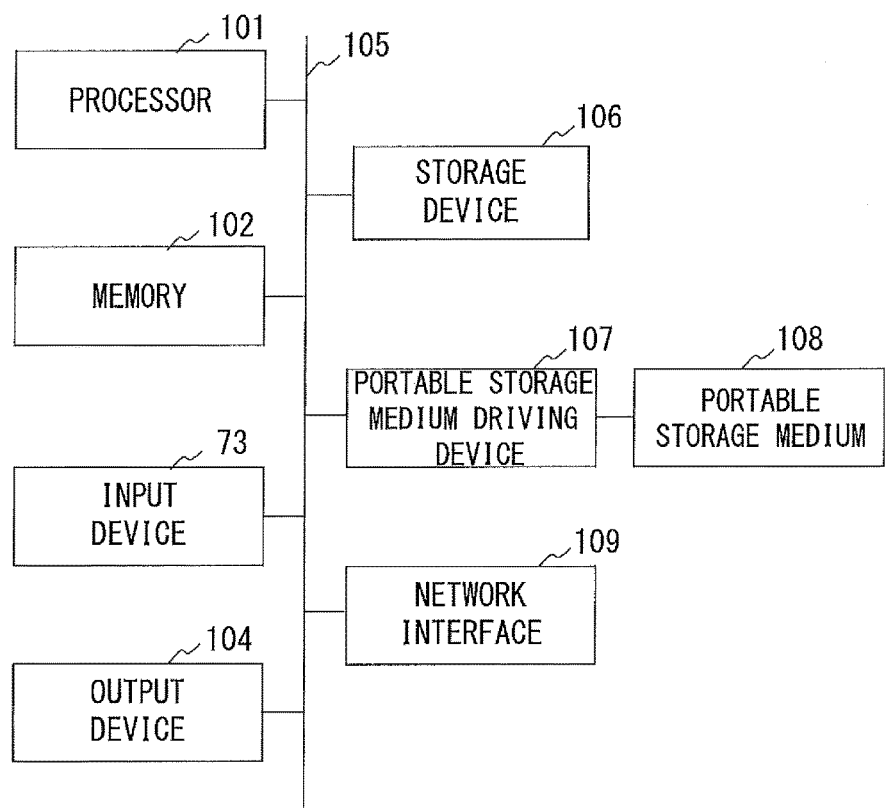
FIG. 3 illustrates an example of a hardware configuration of the control device.

FIG. 3 illustrates an example of a hardware configuration of the control device 30. The control device 30 includes a processor 101, a memory 102, an input device 73, an output device 104, a bus 105 and a network interface 109. The control device 30 may further include at least one each of a storage device 106 and a portable storage medium driving device 107. The processor 101 is an arbitrary processing circuit whose examples include a Central Processing Unit (CPU) and can execute a program stored in the memory 102 or the storage device 106. The processor 101 realizes the detection process unit 40 and the disaster information determination unit 50. The memory 102 operates as the storage unit 60. Also, the network interface 109 operates as the communication unit 31. The bus 105 connects the processor 101, the memory 102, the input device 73, the output device 104 and the network interface 109 in such a manner that data can be input and output between them.

The input device 73 is an arbitrary device used for inputting information such as a key board, a mouse, etc., and the output device 104 is an arbitrary device used for outputting data such as the display device 71 whose examples include a display monitor. The portable storage medium driving device 107 can output data of the memory 102 and storage device 106 to a portable storage medium 108, and can also read programs, data, etc. from the portable storage medium 108. In this example, the portable storage medium 108 may be an arbitrary portable storage medium whose examples include a Compact Disc Recordable (CD-R) and Digital Versatile Disk Recordable (DVD-R).

<First embodiment>

Hereinafter, explanations will be given for an example where the first identifier used by each of the access points 20 before disaster information is reported is an SSID (Service Set Identifier) that is set in each of the access points 20 before the occurrence of the disaster. It is assumed that the second identifier used in the setting after a report of disaster information is an SSID used in communications based on the wireless opening due to a disaster. The second identifier may also be an SSID (00000JAPAN), which is a "standardized identifier for a case of a disaster" recommended in the guideline as the SSID used for the wireless opening of the access point 20, and may also be other SSIDs. Also, in the explanations below, setting after a setting change caused by a report of disaster information is also referred to as "disaster setting". In other words, disaster setting is a setting that permits communications using the second identifier. Further, in the explanations below, applying of a setting for opening the access point 20 may also be referred to as "applying of disaster setting".

Figure 4:
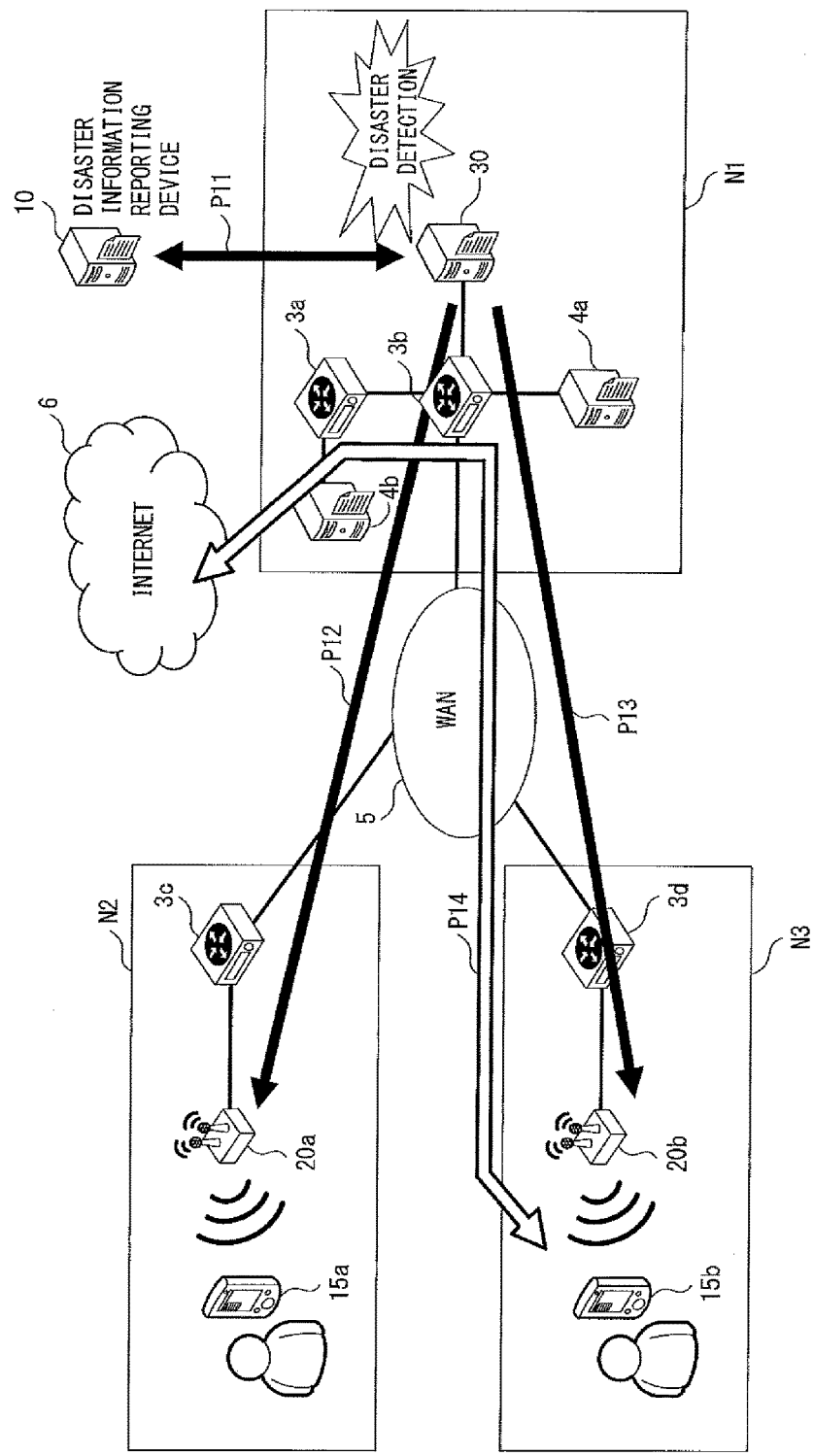
FIG. 4 illustrates an example of a network.

FIG. 4 illustrates an example of a network. In the example illustrated in FIG. 4, networks N1 through N3 are connected via the WAN 5, however, the number of networks connected to network N1 via the WAN 5 is arbitrary. Network N1 is similar to network N1 illustrated in FIG. 1. Network N2 includes a router 3c and an access point 20a, and network N3 includes a router 3d and an access point 20b. It is assumed that, in the initial state, each of the access points 20 (20a, 20b) is set not to give access permission to a terminal not holding the first SSID, which is used as the first identifier. It is assumed that neither the terminal 15a nor the terminal 15b holds the first SSID. Accordingly, when the user of the terminal 15a attempts to access the access point 20a in network N2 in the initial state, communication is refused. Similarly, when the user of the terminal 15b attempts to access the access point 20b in network N3, communications are not possible.

As represented by procedure P11 in FIG. 4, when a disaster has occurred or caution against disasters is called for, the control device 30 obtains disaster information from the disaster information reporting device 10. Note that disaster information can be reported as either of the two types: the push type, in which the disaster information reporting device 10 spontaneously transmits disaster information to the control device 30, or the pull type, in which the disaster information reporting device 10 reports disaster information in response to a request from the control device 30. The receiver 33 of the control device 30 outputs, to the distribution unit 43, a packet containing disaster information transmitted from the disaster information reporting device 10.

Figure 5:
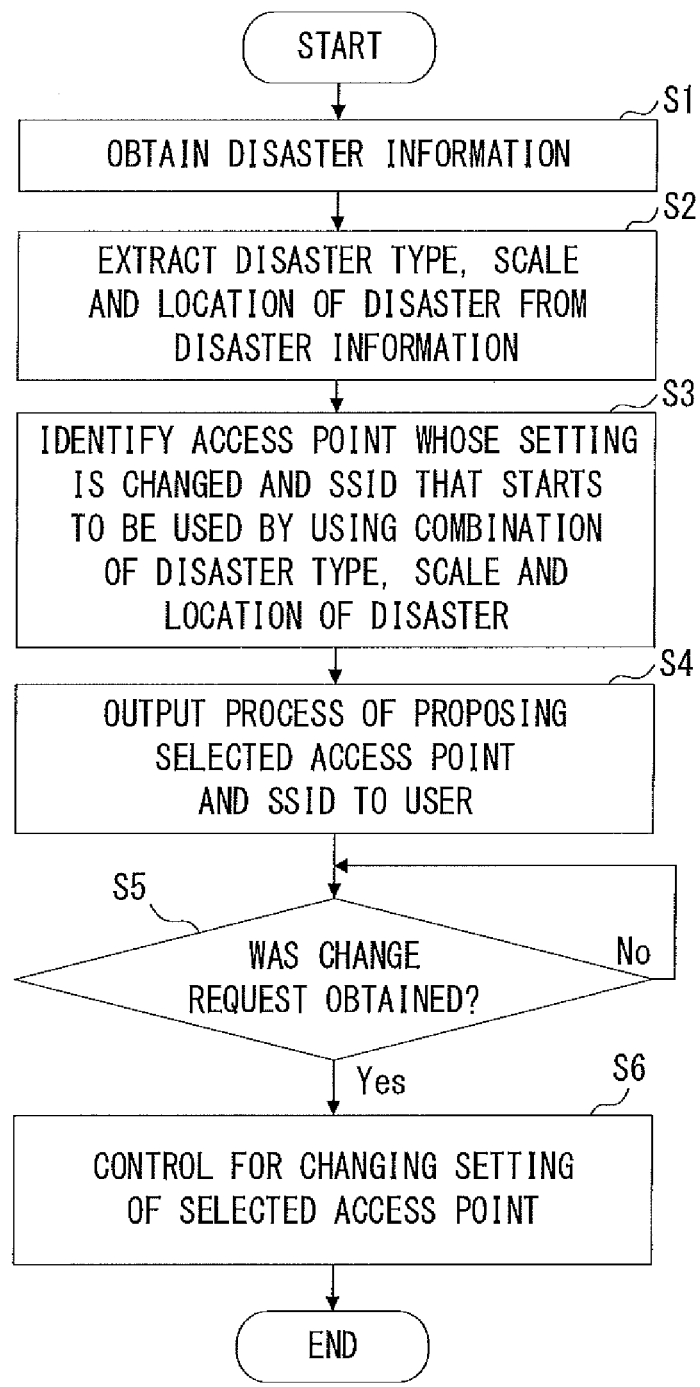
FIG. 5 is a flowchart illustrating an example of operations of the control device.

FIG. 5 is a flowchart illustrating an example of operations of the control device 30. In step S1, the distribution unit 43 selects a packet containing disaster information from among input packets, and outputs the selected packet to the extraction unit 41. In this example, examples of the disaster information reporting device 10 include, among others, a disaster prevention server of the Japan Meteorological Agency, an apparatus serving as a transmission source of the national early warning system (J-Alert), a server of a non-governmental system that reports disaster information. The distribution unit 43 has stored an IP (Internet Protocol) address assigned to the apparatus operating as the disaster information reporting device 10, information of a Web page providing disaster information, transmission sources of e-mails, etc. In this configuration, the distribution unit 43 uses information such as stored addresses etc. so as to select a packet containing disaster information, and outputs the selected packet to the extraction unit 41. The extraction unit 41 obtains disaster information from the input packet.

In step S2, the extraction unit 41 extracts the disaster type, the scale of the disaster and the location of the disaster from the disaster information. Note that when the caution level for a disaster has been reported as disaster information, the extraction unit 41 extracts information representing the caution level of the disaster instead of the scale of the disaster. When a combination of the type and scale of the disaster or of the type and caution level of the disaster is included in the disaster information table 62, the extraction unit 41 determines that the disaster setting is applied to the access points 20 that are installed in the area etc. for which the disaster information was generated.

Note that disaster information that contain information representing caution levels may be set as disaster types depending upon the setting and reporting methods of disaster information. For example, a warning and an advisory can be set as disaster types included in disaster information to be reported. As described above, when a disaster type containing a caution level is set as the disaster type in the disaster information, the extraction unit 41 searches the disaster information table 62 by using the disaster type as a key, and thereby can determine whether or not the disaster setting is to be applied to the access points 20.

FIG. 6 illustrates an example of the disaster information table 62. In the disaster information table 62, the reporting source of disaster information, the disaster type and the disaster level are recorded for each case for which the access points 20 are opened. A "disaster level" is a value representing the scale of a disaster for a case when that disaster has already occurred, and is a value that represents the level of caution for a case of a disaster that has not occurred yet but is a target of caution. In the example illustrated in FIG. 6, it is set that the access points 20 are opened in response to the occurrence of an earthquake of intensity 5 upper (Japanese scale), the issuance of a tsunami warning or the issuance of a warning against a weather phenomenon from a disaster prevention server of the Japan Meteorological Agency. Further, in a case when the disaster information table 62 illustrated in FIG. 6 is used, the access points 20 can be opened also when the occurrence of an earthquake of intensity 5 upper or greater or the issuance of a warning against a weather phenomenon etc. has been reported from J-Alert. The access point 20 may be opened also on the bases of information other than information from state institutions such as the Japan Meteorological Agency, the Fire and Disaster Management Agency, etc. In the example of the disaster information table 62 illustrated in FIG. 6, it is set that the access points 20 can be opened when the occurrence of an earthquake of intensity 5 upper or greater has been reported by an e-mail transmitted for reporting disaster information (disaster information mail) by a non-governmental entity in addition to state institutions.

It is assumed for example that the control device 30 has received a tsunami warning from a disaster prevention server of the Japan Meteorological Agency that is operating as the disaster information reporting device 10. Then, the extraction unit 41 refers to the disaster information table 62 illustrated in FIG. 6 so as to determine that disaster setting is to be conducted on the access points 20 in the area for which the disaster information has been generated. Then, the extraction unit 41 requests that the identification unit 42 identify the access points 20 that are targets of disaster setting.

Note that in the example illustrated in FIG. 6, the disaster type in disaster information for a disaster other than an earthquake reported from J-Alert is information for which the caution level can be identified. For example, for a disaster other than an earthquake reported from J-Alert, a warning can be reported as the disaster type. Accordingly, in the disaster information table 62, warning is registered as a disaster type reported for a disaster other than an earthquake reported from J-Alert, and an invalid value is set as the disaster level. Accordingly, when a disaster other than an earthquake has been reported from J-Alert, the extraction unit 41 uses the disaster type so as to determine whether or not opening setting is to be given to the access points 20.

In step S3 in FIG. 5, the identification unit 42 refers to the control-target device table 61 by using, as a key, a combination of the disaster type, the disaster level and the location of the disaster, and thereby identifies the access points 20 on which the disaster setting is to be conducted. Further, the identification unit 42 may identify the SSID (second SSID) used in the disaster setting. Note that the second SSID is an identifier that is used for communications with the unspecified terminal 15 in the disaster setting.

FIG. 7 illustrates an example of the control-target device table 61. The control-target device table 61 includes, for each access point 20, the device IP address assigned to the access point 20, an opening condition and a determination condition based on an installation location. An opening condition is a combination of a disaster type and a disaster level. A determination condition based on an installation location includes a device installation location and setting information of an adjacent area of the device installation location. When disaster information related to a disaster that meets an opening condition has been reported for the device installation location or for a scope specified as an adjacent area, the access point 20 becomes a target of disaster setting. A device installation location and an adjacent area can be set by using longitude and latitude, and may also be set by using geographical names or map information. For example, the access point 20 that has been assigned the IP address of 192.168.0.1 becomes an applying target the disaster setting when an earthquake of intensity 5 upper or greater has occurred in an area that is within 10 minutes in latitude or longitude from east longitude 139 degrees, 45 minutes, 57.9 seconds; north latitude 35 degrees, 40 minutes, 53.0 seconds. The access point 20 that has been assigned the IP address of 192.168.0.2 is installed in Tama region, and becomes an applying target of the disaster setting when a tsunami warning has been issued for an area that is specified as Tama region or as an area surrounding Tama region. Note that when installation locations or adjacent areas are set by using geographical names or map information, the control device 30 also holds map information in the storage unit 60. Also, the control device 30 holds setting information of surrounding areas together with map information. For example, it is assumed that the eastern part of Tokyo's 23 wards, the western part of Tokyo's 23 wards and the eastern part of Kanagawa prefecture are set as areas surrounding Tama region. In such a case, when a tsunami warning has been issued for one of the eastern part of Tokyo's 23 wards, the western part of Tokyo's 23 wards and the eastern part of Kanagawa prefecture, the access point 20 with IP address of 192.168.0.2 becomes an applying target of the disaster setting.

The identification unit 42 records, in the list, information for identifying the access point 20 that becomes an applying target of the disaster setting. In this process, the identification unit 42 may also include the second SSID used in the disaster setting in the list.

In step S4 in FIG. 5, the output process unit 52 outputs information in the list to the display device 71 in order to propose the access points 20 included in the list to the operator. It is also possible for the output process unit 52 to output to the display device 71 the second SSID together with information of the access point 20 that becomes an applying target of the disaster setting in this process. It is also possible for the output process unit 52 to generate a reporting mail addressed to an e-mail address that is a reporting destination registered in advance and transmit the reporting mail via the transmitter 32.

FIG. 8 illustrates an example of the reporting destination table 63. It is assumed that e-mail addresses used by operators of the control device 30 etc. are registered in the reporting destination table 63. The output process unit 52 generates a reporting mail for reporting a list of identified access point 20 to an address registered in the reporting destination table 63.

When disaster setting is conducted on the access point 20, the operator of the control device 30 inputs a request for the control device 30 to conduct disaster setting. An arbitrary method can be used for inputting a request for disaster setting by using the input device 73. For example, the operator may input a command that has been specified in advance as a request for disaster setting. When a button for confirming whether or not to conduct disaster setting is displayed in the display device 71 together with the list of the access point 20 that are disaster setting targets, the operator can make a request for disaster setting by pressing the confirmation button by using the input device 73. When the operator has received a reporting mail containing the list reporting the access points 20 that are targets of disaster setting from the control device 30, the operator returns to the control device 30 an e-mail that instructs the control device 30 to conduct the disaster setting.

In step S5 in FIG. 5, the control unit 54 of the control device 30 determines whether or not a change request has been received from the operator. The control unit 54 obtains information input from the input device 73 and an e-mail received via the distribution unit 43. In this example, it is assumed that the distribution unit 43 outputs to the control unit 54 a packet containing information of an e-mail transmitted from an address included in the reporting destination table 63 among packets input from the receiver 33. Accordingly, the control unit 54 can analyze the contents of e-mails transmitted from the operator by using packets input from the distribution unit 43. The control unit 54 waits until a change request is obtained from the operator (No in step S5). Obtaining a change request from the operator, the control unit 54 conducts control for changing the setting of the selected access point 20 (Yes in step S5, step S6).

It is assumed for example that in step S4 the information of the access points 20a and 20b illustrated in FIG. 4 have been displayed in the display device 71 as access points to which disaster setting is to be applied and that the operator has input a change request to the control device 30 in order to apply the disaster setting to the access points 20a and 20b. When the control unit 54 of the control device 30 has determined that a change request has been input, the control unit 54 reports, to the access points 20a and 20b, a request to change the setting and the second SSID used for communications after the change of the setting (procedures P12 and P13 in FIG. 4).

On the basis of the request to change the setting received in procedure P12, the access point 20a changes the setting so that permission is given to a communication from the unspecified terminal 15 using the second SSID. The access point 20b also changes the setting similarly on the basis of the request to change the setting received in procedure P13. Note that the control device 30 also changes the setting of the routers 3 etc. on the route from network N1 to the access point 20a or 20b on an as-needed basis.

Accordingly, after the setting has been changed due to the occurrence of a disaster, the terminal 15b can access the access point 20b by using the second SSID. Also, the terminal 15b can also have communications with a device in network N1 and in the Internet 6 via the access point 20b (procedure P14). Note that the terminal 15a also can access a device etc. in the Internet 6 via the access point 20a similarly to the terminal 15b.

As described above, by using the control device 30 according to the embodiment, the operator can receive from the control device 30 a proposal of the access points 20 whose opening is recommended on the basis of the disaster information. Further, when a change request to open the proposed access point 20 has been input to the control device 30, a process of opening at least one proposed access point 20 is conducted by the control device 30 autonomously. This makes it possible for the operator to conduct, in a simple manner, the selection and setting change of an access point whose setting is to be changed.

<Second embodiment>

In the second embodiment, explanations will be given for a case where setting is conducted so that the access points 20 are forcibly opened when a change request is not made to the control device 30 within a prescribed period of time and a request indicating that disaster setting is not conducted has not been received. The generating method of the list of the access points 20 that become targets of disaster setting, the output process conducted by the output process unit 52 and the process of communications to a communication destination in the reporting destination table 63 are similar to those in the first embodiment.

Figure 9:
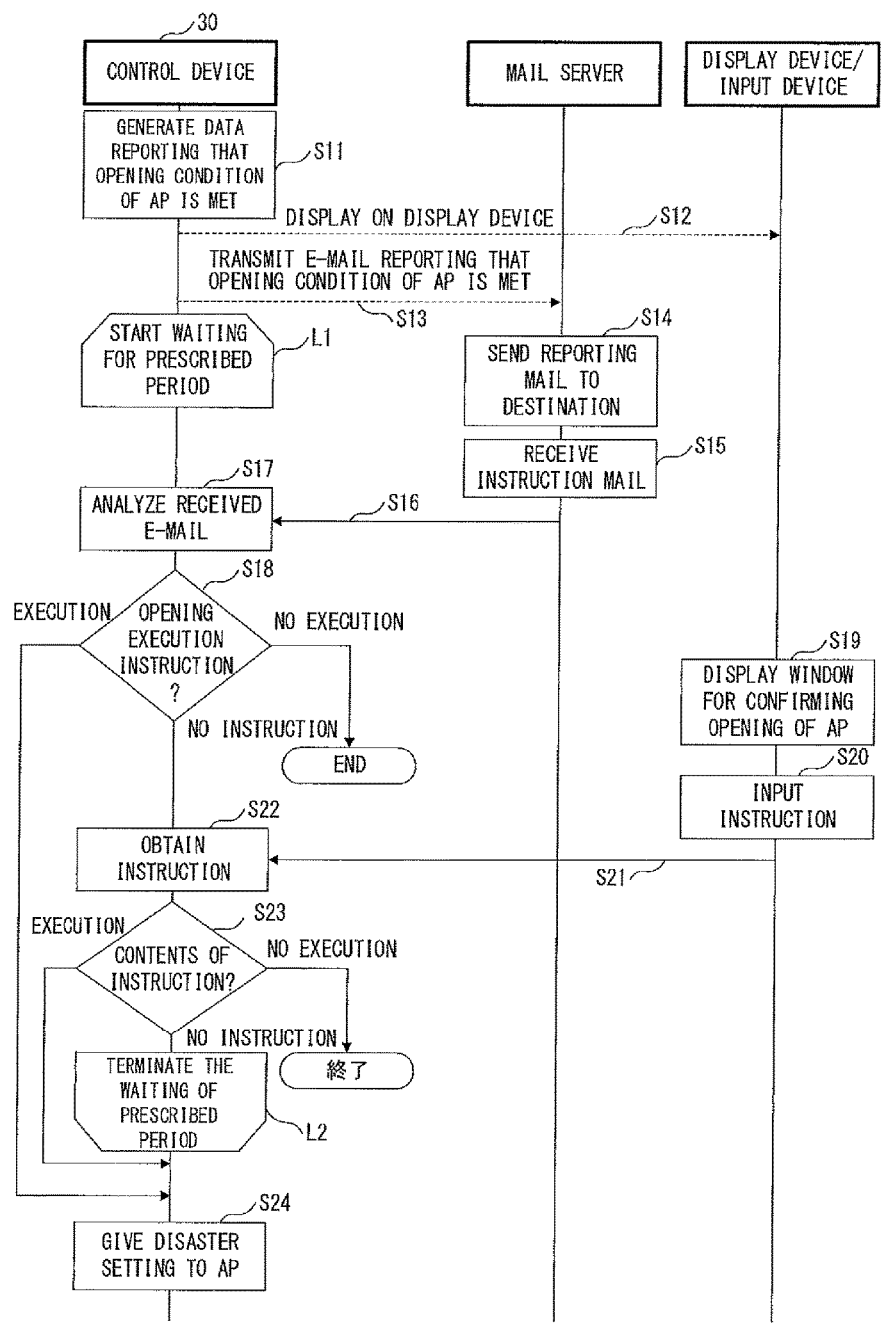
FIG. 9 is a sequence diagram explaining an example of a method of conducting disaster setting.

FIG. 9 is a sequence diagram explaining an example of a method of conducting disaster setting. The output process unit 52 in the control device 30 generates report data indicating that the opening condition of the access point (AP) 20 is met (step S11). The output process unit 52 makes the display device 71 display an approval button together with a list of the access points 20 that have met the opening condition (step S12). Further, the output process unit 52 transmits an e-mail reporting that the opening condition of the access point 20 is met to a communication destination recorded in the reporting destination table 63 (step S13). After the processes in steps S12 and S13, the control unit 54 conducts the processes between loop ends L1 and L2 until a prescribed period of time has elapsed. Also, a period of time that has elapsed since the time when the process in step S13 is conducted is measured by a timer 53.

Meanwhile, the mail server transmits the e-mail received in step S13 (reporting mail) to the destination (step S14). At the destination terminal, the operator receives the reporting mail and generates an instruction mail containing an instruction for the control device 30 as a return for the reporting mail. When the instruction mail has been transmitted to the mail server in accordance with the process conducted by the operator, the mail server receives the instruction mail (step S15). The mail server transfers the instruction mail to the control device 30 (step S16).

When the control unit 54 of the control device 30 has received the e-mail via the distribution unit 43, the control device 30 analyzes the received e-mail (step S17). When the received e-mail contains an instruction not to execute the opening of the access point 20, the control unit 54 terminates the process ("no execution" in step S18). When it is not possible to recognize the contents of the instruction from the received e-mail or when the received e-mail does not contain an instruction, the control unit 54 waits without conducting processes ("no instruction" in step S18). When the received e-mail contains an instruction to execute the opening of the access point 20, the control unit 54 conducts a process of giving disaster setting to the access point 20 that meets the opening condition ("execution" in step S18, step S24).

Next, a case is described where an instruction is made via the input device 73. The display device 71 displays data that was input in step S12 and a button used for making an approval instruction or an instruction to cancel the execution as an opening confirmation window of the access point 20 (step S19). By confirming the displayed information on the display device 71, the operator recognizes that there exists the access point 20 that meets the opening condition. The operator selects the approval button or the execution cancellation button. In response to this process conducted by the operator, the input device 73 outputs to the control unit 54 information associated with the selected button (steps S20 and S21).

The control unit 54 obtains the input instruction (step S22). When it is instructed not to execute the opening of the access point 20 by the instruction, the control unit 54 terminates the process ("no execution" in step S23). When it is not possible to identify the contents of the instruction or the input information is invalid, the control unit 54 waits without conducting processes ("no instruction" in step S23). When it is instructed to execute the opening of the access point 20 by the instruction, the control unit 54 conducts a process of giving the disaster setting to the access point 20 that meets the opening condition ("execution" in step S23, step S24). Further, when a prescribed period of time has elapsed after the process in step S13, the control unit 54 conducts a process of giving the disaster setting to the access point 20 that meets the opening condition (step S24) when there is no instructions to cancel the execution in step S18 or step S23.

While the processes in step S19 through step S23 are conducted after the processes in step S14 through step S18 in FIG. 9 for the sake of convenience, the processes in step S14 through step S18 and the processes in step S19 through step S23 may be conducted in reverse order. It is also possible to conduct the processes in step S14 through step S18 and the processes in step S19 through step S23 in parallel. Further, the control device 30 terminates the loop process between loop ends L1 and L2 when a prescribed period of time has elapsed after the process in step S13 has been terminated even when an instruction mail has not been received and input of an instruction via the input device 73 has not been detected. In other words, even when an instruction mail has not been received and input of an instruction via the input device 73 has not been detected, the control device 30 can give disaster setting to the access point 20 when a prescribed period of time has elapsed after the output process of the access point 20 for which the disaster setting can be conducted.

Also, the order of the processes in step S12 and step S13 can be changed. Further, step S12 and step S13 may be conducted in parallel. When the process in step S12 is executed after the process in step S13, the timer 53 measures a period of time that has elapsed after the process in step S12, and when the elapsed period of time has exceeded a prescribed period, the control unit 54 conducts the process of applying disaster setting.

As described above, according to the second embodiment, when a change request is not made within a prescribed period of time and a request indicating that disaster setting is not conducted has not been received, the control device 30 forcibly opens the access point 20. This makes it possible to open the access point 20 even when it is not possible for the operator to input a change request to the control device 30 due to a too enormous damage etc. caused by the disaster.

<Third embodiment>

Next, explanations will be given for a case where a weighting process is conducted in accordance with the scale and the caution level of a disaster reported by disaster information and whether or not to apply disaster setting to the access point 20 is determined on the basis of the result of the weighting process.

Figure 10:
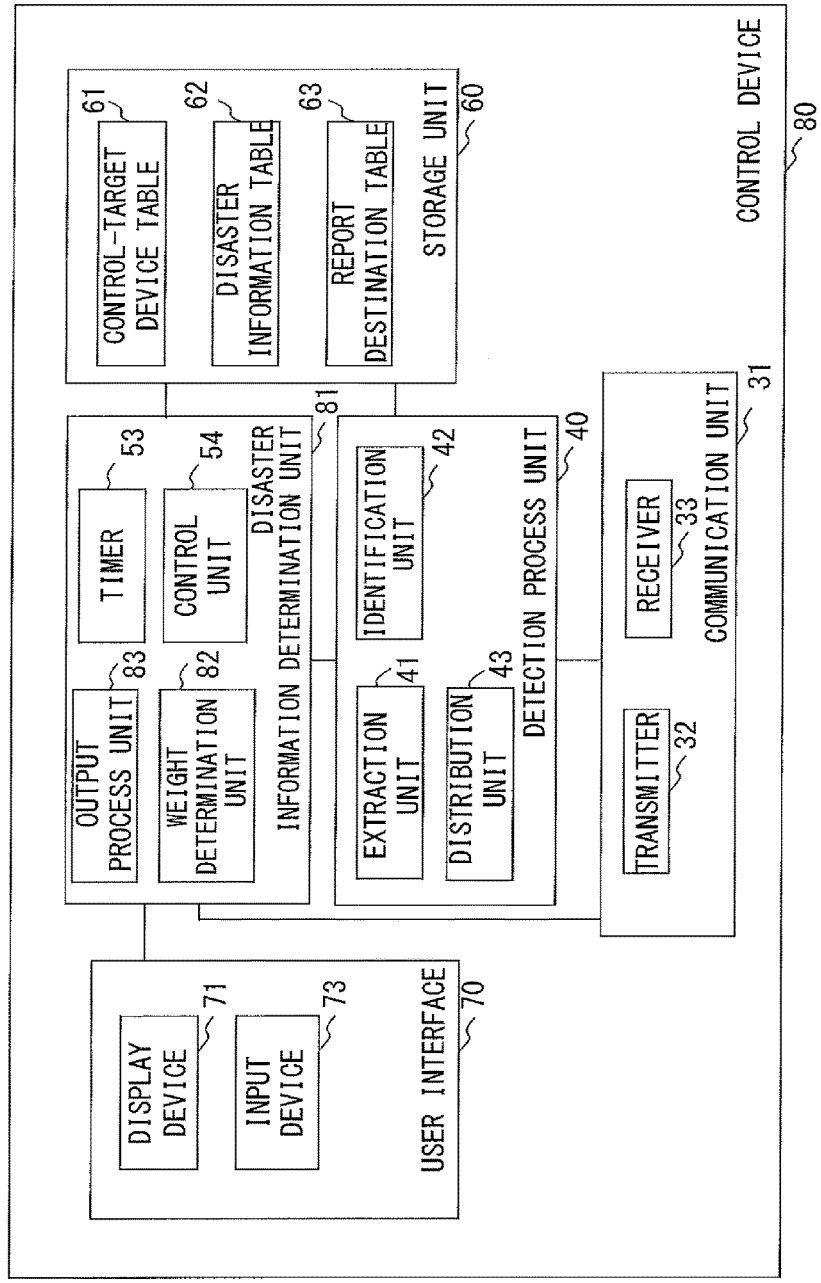
FIG. 10 illustrates an example of a configuration of a control device used in a third embodiment.

FIG. 10 illustrates an example of a configuration of a control device 80 used in a third embodiment. The control device 80 includes the communication unit 31, the detection process unit 40, the storage unit 60, the user interface 70 and a disaster information determination unit 81. The process conducted by the communication unit 31, the detection process unit 40, the storage unit 60 and the user interface 70 included in the control device 80 are similar to those of the control device 30. The disaster information determination unit 81 includes a weight determination unit 82, an output process unit 83, the timer 53 and the control unit 54.

The weight determination unit 82 determines a weight by using the reliability and the disaster level of the disaster information. A weight is an index value used for evaluating disaster information by using the reliability of information reported by the providing source of the disaster information and the scale or the caution level of the disaster reported in the disaster information. Accordingly, the higher the value of the weight of a certain one of the access points 20 is, the more it is desirable to give disaster setting to that one of the access points 20. The output process unit 83 outputs, to the display device 71 etc., information about the access point 20 having a weight equal to or greater than a prescribed threshold among the access points 20 identified on the basis of a determination condition based on the opening condition and the installation location. The processes conducted by the timer 53 and the control unit 54 are similar to those in the first and second embodiments.

FIG. 11 is a sequence diagram explaining an example of a method of identifying the access point 20. While FIG. 11 illustrates an example of a case where the occurrence of a disaster has been reported, similar processes are conducted even when caution against a disaster has been reported as disaster setting. When a disaster has occurred, the occurrence of the disaster is reported to the control device 80 from the disaster information reporting device 10 (steps S31 and S32). The extraction unit 41 in the control device 80 analyzes the reported disaster information and extracts the disaster type, the scale of the disaster and the location of the disaster, while the weight determination unit 82 determines a weight for each of the access points 20 (step S33). Methods of determining a weight will be described later in detail. The identification unit 42 determines whether or not a disaster that leads to opening of the access point 20 (step S34) has occurred on the basis of whether or not the combination of the disaster type and the disaster level is recorded in the disaster information table 62 (step S34). When the combination of the disaster type and the disaster level is not included in the disaster information table 62, the control device 80 determines that disaster setting is not to be given to the access point 20, and terminates the process (No in step S34). When the combination of the disaster type and the disaster level is included in the disaster information table 62, the identification unit 42 determines whether or not each of the access points 20 becomes a target of disaster setting by using the information of the opening condition and the installation location (Yes in step S34, step S35). When none of the access points 20 is identified as a target of applying of the disaster setting, the identification unit 42 terminates the process ("No" in step S35). When at least one of the access points 20 has been identified as a target of wireless opening on the basis of the disaster setting, the identification unit 42 generates a list of the identified access points 20 (wireless opening request device list) ("Yes" in step S35, step S36). The identification unit 42 outputs the wireless opening request device list to the output process unit 83.

FIG. 12 illustrates an example of the disaster information table 62 used in the third embodiment. In the disaster information table 62, the reporting source of the disaster information, the disaster type, the disaster level and the weighting are recorded for each case that has possibility of leading to giving disaster setting to the access point 20. In this example, weighting is used for determining weights of the access points 20, and is determined on the basis of combinations of the reporting sources of the disaster information, the disaster types and the disaster levels. When for example the occurrence of an earthquake of intensity 5 upper has been reported from a disaster prevention server of Japan Meteorological Agency, "100" is used as the weight, while when the occurrence of an earthquake of intensity 4 has been reported from a disaster prevention server of Japan Meteorological Agency, the weight is "50". Similarly, a weight used when a warning has been issued against a tsunami or other weather phenomena, the weight has a value greater than a weight used when an advisory has been issued against the same type of phenomenon. Also, as explained by referring to FIG. 6, when a value including a caution level against a disaster has been set, an invalid value may be set as a disaster level in the disaster information table 62. In such a case, a weight is set in accordance with the reporting source of the disaster information and the disaster type. Note that the values of weighting in FIG. 12 are examples and values used for weighting may be changed in accordance with implementations.

Figure 13:
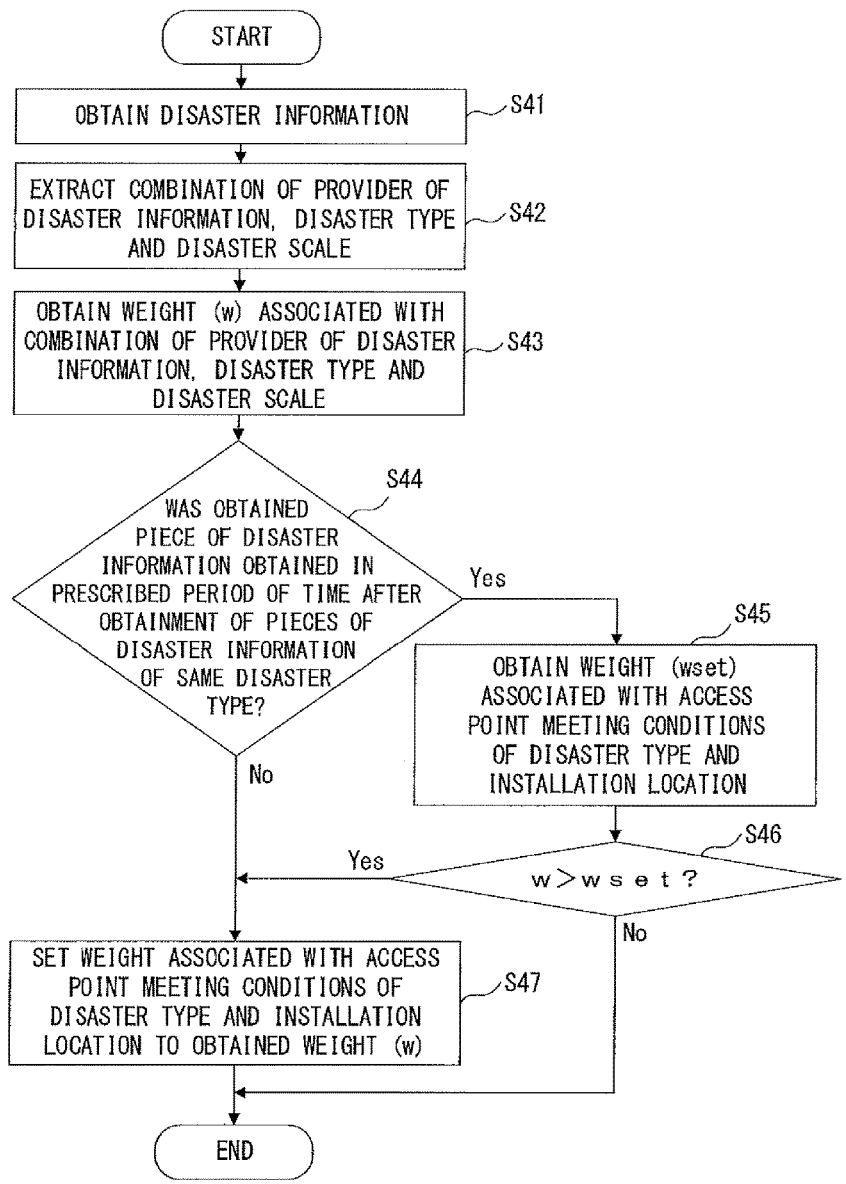
FIG. 13 explains an example of a method of determining a weight.

FIG. 13 explains an example of a method of determining a weight. The extraction unit 41 uses a packet obtained via the distribution unit 43 so as to obtain disaster information (step S41). The extraction unit 41 extracts a combination of the providing source, the disaster type and the disaster level of the disaster information (step S42). Note that when disaster information used for caution against a disaster that has not yet occurred has been obtained, the extraction unit 41 identifies the caution level of the expected disaster by which of an advisory and a warning has been issued etc. instead of identifying the scale of the disaster, and outputs the obtained information to the weight determination unit 82.

In step S43, the weight determination unit 82 uses the disaster information table 62 so as to obtain a weight (w) associated with the combination of the providing source of the disaster information, the disaster type and the disaster level. When for example the occurrence of an earthquake of intensity 5 upper or greater has been reported from a disaster prevention server of the Japan Meteorological Agency that is operating as the disaster information reporting device 10, the weight determination unit 82 uses the disaster information table 62 (FIG. 12) so as to determine "100" as the weight associated with the disaster information.

FIG. 14 explains an example of the control-target device table 61 used in the third embodiment. The control-target device table 61 stores, for each of the access points 20, the device IP address, the opening condition, the determination condition based on the installation location and the weighting status. Hereinafter, explanations will be given for a process of setting a weight by referring to FIG. 14.

In step S44 in FIG. 13, a weight determination unit 82 determines whether or not the obtained piece of disaster information was obtained in a prescribed period of time after the obtainment of pieces of disaster information of the same disaster type. When the obtained piece of disaster information was not obtained in a prescribed period of time after the obtainment of pieces of disaster information of the same disaster type, the weight determination unit 82 determines that information related to the disaster reported in the disaster information has not been obtained (No in step S44). Accordingly, the weight determination unit 82 sets, to the obtained weight, the weight for the access point 20 that has the conditions of the disaster type and the location of the disaster meeting the disaster information (step S47). Note that when the location of the disaster is the installation location of the access point 20 or in an area specified as an adjacent area, the weight determination unit 82 determines that the condition of the location of the disaster meets the disaster information.

It is assumed for example that the control device 80 has obtained disaster information from a disaster prevention server of the Japan Meteorological Agency reporting that an earthquake of intensity 5 upper or greater has occurred in an area that is within 10 minutes in latitude or longitude from east longitude 139 degrees, 45 minutes, 57.9 seconds; north latitude 35 degrees, 40 minutes, 53.0 seconds. In such a case, the weight for the obtained disaster information is "100". Further, it is assumed that disaster information about earthquakes has not been reported to the control device 80 in a prescribed period before obtaining this disaster information. Then, the weight determination unit 82 determines "100" as the weight for the access point 20 with the IP address of 192.168.0.1, as illustrated in FIG. 14.

When disaster information of the process target has been obtained in a prescribed period of time after the obtainment of disaster information of the same disaster type, the weight determination unit 82 determines that information related to the same disaster as a disaster for which the disaster information had already been obtained has been obtained (Yes in step S44). Then, the weight determination unit 82 obtains a weight (wset) associated with the access point 20 that meets the conditions of the disaster type and the installation location in the control-target device table 61 (step S45). The weight determination unit 82 compares weight w obtained in step S43 for the disaster information of the process target and weight wset already associated with the access point 20 that is the target of the disaster information (step S46). When weight w obtained for the disaster information of the process target is heavier than weight west associated with the access point 20, the weight determination unit 82 updates the weight associated with the access point 20 to w (Yes in step S46, step S47). When weight w obtained for the disaster information of the process target is equal to or lighter than weight wset associated with the access point 20, the weight determination unit 82 terminates the process (No in step S46).

It is assumed for example that "100" has been set as the weight for the access point 20 with the IP address of 192.168.0.1 as illustrated in FIG. 14. Further, it is also assumed that the occurrence of an earthquake of intensity 5 upper in the installation location of the access point with the IP address of 192.168.0.1 has been reported to the control device 80 by a disaster information mail. Then, the weight determination unit 82 uses the disaster information table 62 so as to determine that the weight for the disaster information of the process target is "50" on the basis of the fact that the transmission source of the information is a disaster information mail and that the reported information is about an earthquake of intensity 5 upper. Further, the weight determination unit 82 determines that while weight w obtained from the disaster information of the process target is "50", weight wset set for the access point 20 meeting the conditions of the disaster information is "100". Then, the weight determination unit 82 terminates the process without updating the weight for the access point with the IP address of 192.168.0.1.

When a tsunami advisory has been issued from a disaster prevention server of the Japan Meteorological Agency for the areas surrounding Tama region, the processes explained by referring to steps S44 and S47 are conducted in a case when the control device 80 has not received information related to a tsunami. Accordingly, the weight for the access point 20 with the IP address of 192.168.0.2 is set to "50" as illustrated in FIG. 14. It is assumed that a tsunami warning has thereafter been issued from a disaster prevention server of the Japan Meteorological Agency for the areas surrounding Tama region. Then, the weight determination unit 82 updates the weight for the access point 20 with the IP address of 192.168.0.2 to 100 (w) from 50 (wset) because weight (w) for the disaster information of the process target is "100".

FIG. 15 is a sequence diagram explaining an example of a determination process. It is assumed that the list of the access points 20 identified by the identification unit 42 (wireless opening request device list) was generated by the procedure explained with reference to FIG. 11. The identification unit 42 outputs the generated wireless opening request device list to the output process unit 83 (step S51). Then, the output process unit 83 conducts the processes in the loop (device list loop) between loop ends L11 and L12 for each of the access points 20 included in the wireless opening request device list. The output process unit 83 determines whether or not the weight associated with the access point 20 that is a process target is equal to or greater than a threshold (step S52). When the weight associated with the access point 20 of the process target is equal to or greater than the threshold, the output process unit 83 adds the information of that access point 20 to a wireless opening target device list (Yes in step S52, step S53). When the weight associated with the access point 20 of the process target is smaller than the threshold, the access point 20 of the process target is changed and the processes in and after step S52 are conducted (No in step S52). When all the access points 20 have been checked in the wireless opening request device list, the output process unit 83 terminates the process in the device list loop. The output process unit 83 determines whether or not there exists the access point 20 that is registered in the wireless opening target device list (step S54). When not one of the access points 20 is registered in the wireless opening target device list, the output process unit 83 terminates the process ("No in step S54). Meanwhile, at least one of the access points 20 is registered in the wireless opening target device list, the output process unit 83 determines that the access point 20 in the wireless opening target device list is a target of disaster setting ("Yes" in step S54). Then, the output process unit 83 conducts a process of outputting information indicating that the access point 20 in the wireless opening target device list is a target of the disaster setting (step S55). The output process conducted by the output process unit 83 in step S55 is similar to the process conducted by the output process unit 52 in the first and second embodiments. The process conducted after the output process may be similar to the processes explained by referring to step S5 and step S6 in FIG. 5, and may also be similar to the processes explained by referring to FIG. 9 in the second embodiment.

As described above, in the third embodiment, whether or not to treat the access point 20 as a target of disaster setting is determined by using the weights associated with the transmission source of the disaster information and disaster scale. Accordingly, even when information for many access points 20 has been generated, it is possible to give priority to the access point 20 for which disaster setting is requested on the basis of disaster information obtained from an information source with high reliability in treating the access points 20 as change targets of setting. Also, even when wrong disaster information has been reported from an information source with low reliability, malfunctions are less likely to occur because small values have been given to weights associated with information sources with low reliability.

The method according to the embodiment simplifies opening of an access point in a case of a disaster.

<Others>

Note that the embodiments of the present invention are not limited to the above, and various modifications are possible.

It is also possible to set, in the control device 30 in advance, a keyword for each item of senders of e-mails, reception accounts, subjects, body texts, etc. In such a case, the control device 30 can determine the type of reception mails such as a change request from the operator in accordance with whether or not a keyword set for each item is contained in the reception mail. The storage unit 60 may store a condition trigger list for storing keywords for conducting these analysis.

When an e-mail transmitted from the operator has been input to the control unit 54 from the distribution unit 43, the control unit 54 recognizes the sender, the reception account, the subject and the body text in the e-mail and conducts preprocessing for comparing each item with a keyword in order to compare each subject with a keyword set in the condition trigger list. The control unit 54 sequentially reads keywords set in the condition trigger list so as to compare them with the recognized text.

It is also possible to set, in the condition trigger list, contents of processes about what kind of processes are to be conducted when there is a hit for a keyword. Contents of process to be executed may include a process of changing setting of an access point. Also, an access point for which setting is changed may be set as a change target. It is also possible to set the second SSID used in disaster setting as a profile to be set for a change-target access point.

By conducting this setting, it is also possible to conduct control so that when there is a hit for a keyword regarding the contents of an e-mail, the second SSID is opened to the access point set in the condition trigger list.

Also, as a keyword set in the condition trigger list, transmission sources of information such as the Japan Meteorological Agency, the Fire and Disaster Management Agency, J-Alert, etc. may be set for the items of senders. It is also possible to set a word or a fixed phrase that specifies the disaster type or the disaster level in the subject or the body text, as a keyword to be set in the condition trigger list. It is also possible to set a process of making a report to the operator, as contents of processes to be executed. It is also possible to use an e-mail address as reporting destination. It is also possible to use a text containing an access point for which setting is to be changed and a second SSID used in disaster setting, as reported contents.

Also, as a setting example, it is also possible to set a word for detecting the occurrence of a disaster as a keyword set in the condition trigger list and conduct a process of changing setting of an access point as contents of a process to be conducted and thereby to conduct automatically a process of opening the second SSID.

Further, the control-target device table 61, the disaster information table 62 and the reporting destination table 63 are examples, and information elements included in these tables may be changed in accordance with implementations.

Also, arrangements of devices in networks may be changed in accordance with implementations. In FIG. 1 and FIG. 4, examples where the disaster information reporting device 10 is not included in the Internet 6 are used, however, the disaster information reporting device 10 may be included in the Internet 6 or the WAN 5. The terminal 15 can communicate with the disaster information reporting device 10 or other communication devices via the access point 20 after the disaster setting is given. In FIG. 1 and FIG. 4, the routers 3 appear as devices for transferring packets, however, transfer devices included in respective networks are not limited to the routers 3 and may include a switch. Further, the communication devices 4 in network N1 are arbitrary devices whose examples include a server, a proxy server, etc.

While an example has been used as a case where one condition for applying disaster setting is set for each of the access points 20 in the above explanations for facilitating understanding, an arbitrary number of conditions may be set for applying disaster setting to one of the access points 20. The access point 20 for which a plurality of conditions are set for applying disaster setting becomes a target of disaster setting when at least one of such conditions is met.

While a case has been used as an example where the identification unit 42 identifies the second SSID in FIG. 5, it is not necessary to identify the second SSID when the SSIDs have a value common to the access points 20. Similarly, when a second SSID used for disaster setting has been determined in advance, it is not necessary for the output process unit 52 or the output process unit 83 to output information of the second SSID for reporting the identified access point 20.

When disaster setting has been applied, the band used for communications employing the first SSID and the band used for communications employing the second SSID are set arbitrarily in accordance with implementations. In other words, even when disaster setting has been applied, communications employing the second SSID may be conducted while continuing the communications employing the first SSID.

Further, it is also possible, by modifying the second embodiment, to conduct setting so that when a request to give disaster setting to the access point 20 has not been made by the operator in a prescribed period of time, the process itself for conducting the disaster setting is terminated. This modification can reduce a risk that disaster setting is given to the access point 20 in response to wrong disaster information.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a control device to execute a process, wherein the control device controls an access point conducting a communication by using a first identifier, the process comprising:
   identifying an access point that becomes a target of disaster setting, in which a communication is conducted by using a second identifier as substitute for the first identifier, based on disaster information obtained from a providing source of information, the first identifier being used for communications with specified terminals, the second identifier being used for communications with unspecified terminals, the access point being identified using a weight for the access point, the weight being determined based on a combination of the providing source, a disaster type and a scale of a disaster, information of each of the providing source, the disaster type and the scale of the disaster being extracted from the disaster information;
   outputting, to a user interface, information for confirming whether or not the disaster setting is to be applied; and
   sending an instruction to apply the disaster setting to the access point when a request to apply the disaster setting has been obtained.

2. The recording medium according to claim 1, wherein the program causes the control device to further execute a process comprising
   sending, to a transfer device included in a route between a terminal communicating with a communication destination via the access point and the communication destination, an instruction to change setting so that a communication between the terminal and the communication destination becomes possible by using the second identifier.

3. The recording medium according to claim 1, wherein the control program causes the control device to execute a process comprising:
   extracting a combination of a disaster type, a scale, and a disaster location that were reported, from disaster information obtained from the providing source; and
   identifying an access point for which the combination meets a condition for conducting the disaster setting in a process of identifying an access point that becomes a target of the disaster setting.

4. A non-transitory computer-readable recording medium having stored therein a program for causing a control device to execute a process, wherein the control device controls an access point conducting a communication by using a first identifier, the process comprising:
   identifying an access point that becomes a target of disaster setting, in which a communication is conducted by using a second identifier as substitute for the first identifier, based on disaster information obtained from a providing source of information, the first identifier being used for communications with specified terminals, the second identifier being used for communications with unspecified terminals, the access point being identified based on reliability of information reported by the providing source and also based on a scale of a disaster or a degree of caution against a disaster reported in the disaster information;
   outputting, to a user interface, information for confirming whether or not the disaster setting is to be applied;
   sending an instruction to apply the disaster setting to the access point when a request to apply the disaster setting has been obtained; and
   sending an instruction to apply the disaster setting to the access point when information indicating whether or not the disaster setting is to be applied has not been input before a period of time that has elapsed after the outputting reaches a prescribed length.

5. A control device that controls an access point conducting a communication by using a first identifier, the control device comprising:
   a processor configured
      to identify an access point that becomes a target of disaster setting, in which a communication is conducted by using a second identifier as substitute for the first identifier, based on disaster information obtained from a providing source of information, the first identifier being used for communications with specified terminals, the second identifier being used for communications with unspecified terminals, the access point being identified using a weight for the access point, the weight being determined based on a combination of the providing source, a disaster type and a scale of a disaster, information of each of the providing source, the disaster type and the scale of the disaster being extracted from the disaster information, and
      to output, to a user interface, information for confirming whether or not the disaster setting is to be applied; and
   a transmitter configured to send an instruction to apply the disaster setting to the access point when a request to apply the disaster setting has been obtained.

6. A control method of a control device that controls an access point conducting a communication by using a first identifier, the method comprising:

identifying an access point that becomes a target of disaster setting, in which a communication is conducted by using a second identifier as substitute for the first identifier, based on disaster information obtained from a providing source of information, the first identifier being used for communications with specified terminals, the second identifier being used for communications with unspecified terminals, the access point being identified using a weight for the access point, the weight being determined based on a combination of the providing source, a disaster type and a scale of a disaster, information of each of the providing source, the disaster type and the scale of the disaster being extracted from the disaster information;

outputting, to a user interface, information for confirming whether or not the disaster setting is to be applied; and sending an instruction to apply the disaster setting to the access point when a request to apply the disaster setting has been obtained.

7. A non-transitory computer-readable recording medium having stored therein a control program causing a control device to execute a process, wherein the control device controls an access point conducting a communication by using a first identifier, the process comprising:

obtaining disaster information from a providing source of information; and identifying automatically, when the disaster information has been obtained, an access point that is a target for which setting is changed using a weight for the access point, and identifying a second identifier that starts to be used as substitute for the first identifier in response to the setting change for the identified access point, the weight being determined based on a combination of the providing source, a disaster type and a scale of a disaster, information of each of the providing source, the disaster type and the scale of the disaster being extracted from the disaster information, wherein the first identifier being used for communications with specified terminals and the second identifier being used for communications with unspecified terminals.

8. A control device that controls an access point conducting a communication by using a first identifier, the control device comprising:

a receiver configured to obtain disaster information from a providing source of information; and a processor configured to identify automatically, when the disaster information has been obtained, an access point that is a target for which setting is changed using a weight for the access point, and to identify a second identifier that starts to be used as substitute for the first identifier in response to the setting change for the identified access point, the weight being determined based on a combination of the providing source, a disaster type and a scale of a disaster, information of each of the providing source, the disaster type and the scale of the disaster being extracted from the disaster information, wherein the first identifier being used for communications with specified terminals and the second identifier being used for communications with unspecified terminals.

* * * * *